UNITED STATES PATENT OFFICE.

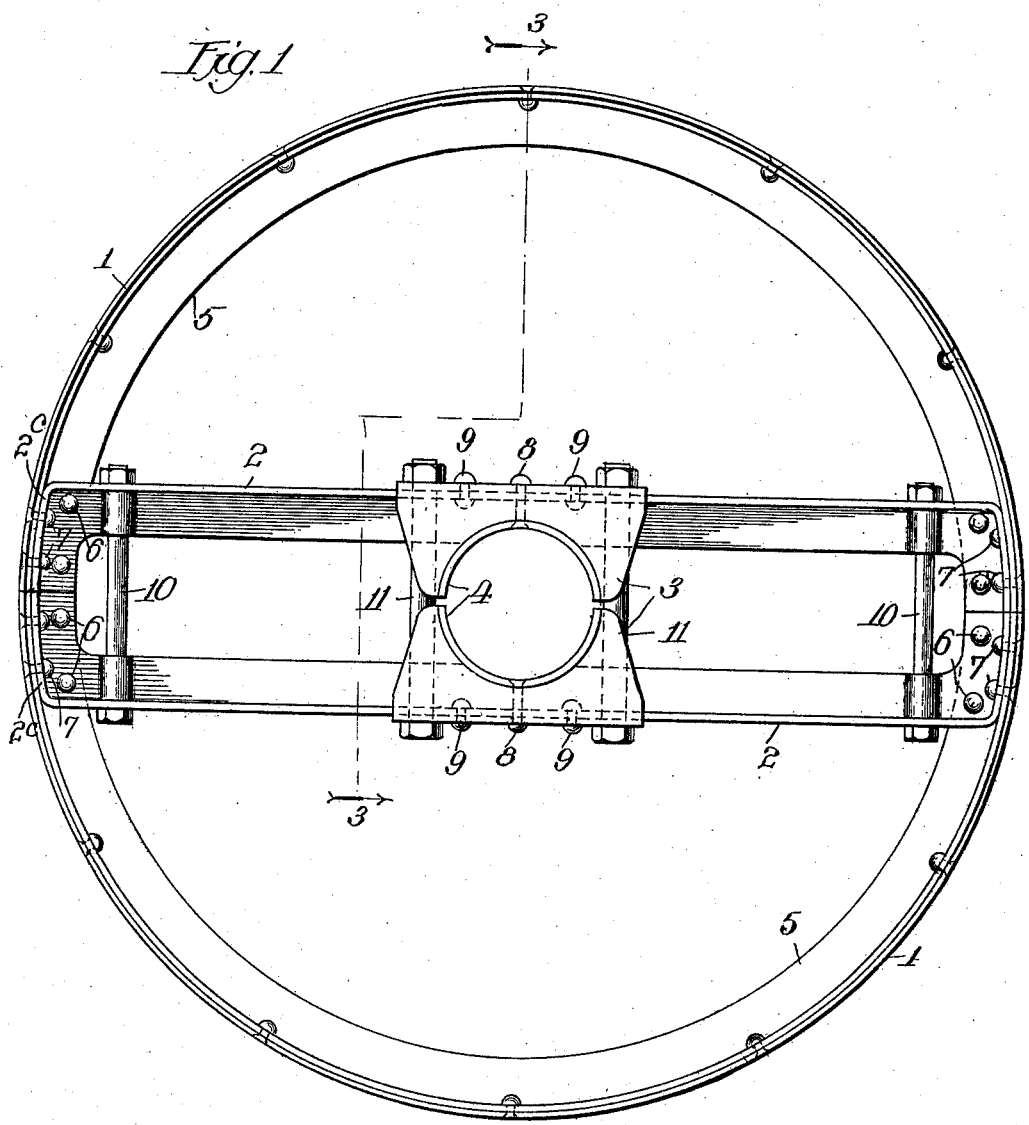

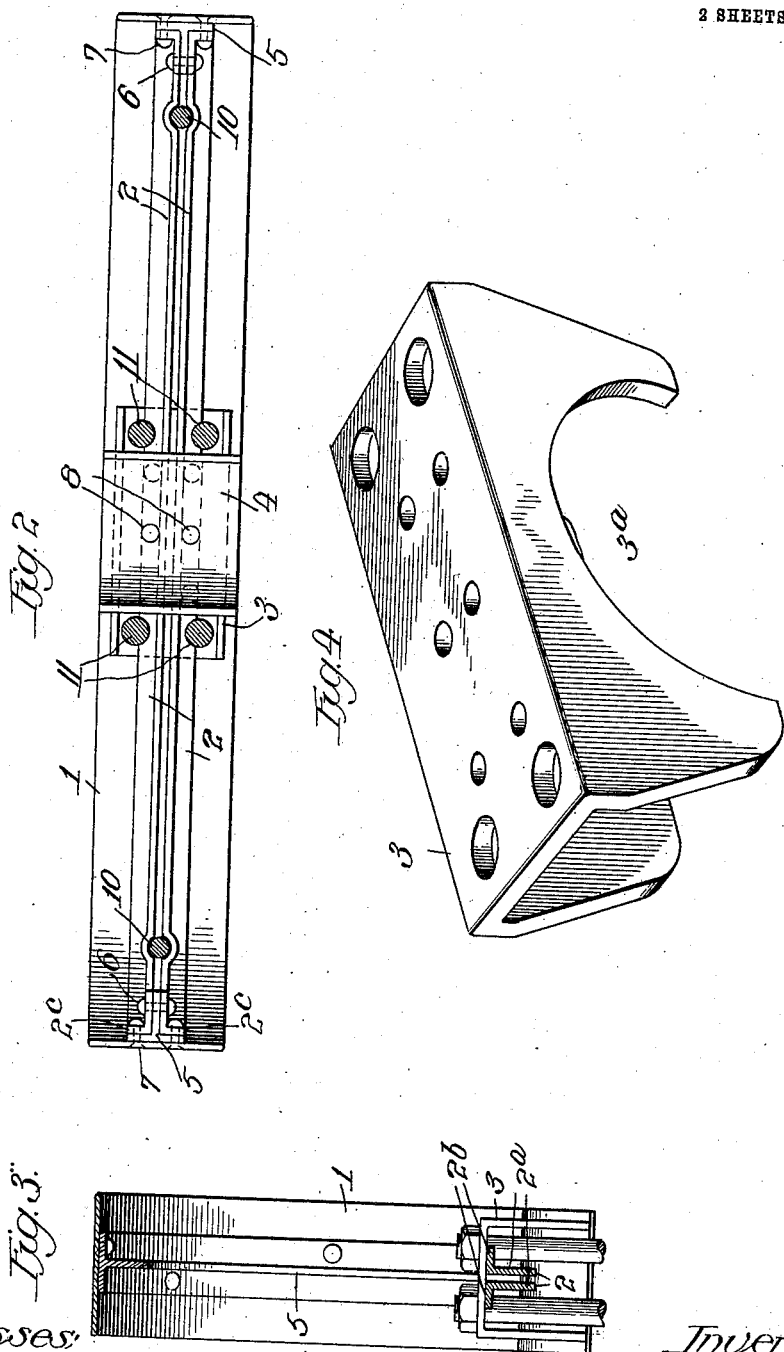

HENRY J. GILBERT, OF SAGINAW, MICHIGAN.

PULLEY.

986,629.

Specification of Letters Patent.     Patented Mar. 14, 1911.

Application filed May 23, 1904. Serial No. 209,336.

*To all whom it may concern:*

Be it known that I, HENRY J. GILBERT, a citizen of the United States, residing at Saginaw, in the county of Saginaw and State of Michigan, have invented certain new and useful Improvements in Pulleys, of which the following is a specification.

My invention relates more specifically to pulleys constructed of sheet metal and has for its principal object the production of a sheet metal pulley having an improved construction of spoke arm and hub sections, with the result that a pulley, simple and economical of manufacture and durable and efficient in operation, is obtained.

The various features of advantage and utility of my improved pulley will be apparent from the description hereinafter given.

In the drawings, Figure 1 is a side elevation of a pulley embodying my invention; Fig. 2 a sectional plan thereof on the division plane of the pulley halves; Fig. 3 a section on line 3—3 of Fig. 1; and Fig. 4 a perspective of one of the hub sections or yokes of the pulley.

The same reference characters are used to indicate corresponding parts in the several views in the drawings.

As herein shown, my improved pulley comprises the rim segments 1, the parallel spoke arms 2 connected at their ends therewith and the hub sections or saddles 3 carried at the middle portion of such spoke arms. If desired, a split hub thimble 4 may also be employed, as herein illustrated.

The spoke arms 2 are made of angle irons, but I do not herein broadly claim such construction of spoke arm and the connection thereof with the rim, inasmuch as I have made the same the subject-matter of a separate application filed by me on May 23, 1904, Serial No. 209,334.

The rim segments 1 may be of any desired or required width and in the present instance, but without any intention of limitation in any respect, I have illustrated narrow-faced pulley rim segments, to whose inner face or surface are secured the T-irons 5, one for each segment. These T-irons serve to strengthen or reinforce the rim segments as well as to afford the medium of connection of the spoke arms therewith.

The spoke arms are, as above stated, made of angle irons with one flange 2ª arranged in a radial plane of the pulley and the other flange 2ᵇ in a plane parallel to the plane of division or separation of the pulley halves. These spoke arms are arranged in pairs and in the particular size and diameter of pulley illustrated two pairs of such spoke arms are employed. The radial flanges of the spoke arms of each rim segment are positioned adjacent each other and, by preference, quite close to each other, as seen in Fig. 3. The ends of each spoke arm are secured to the web or stem of the T-iron in suitable manner, as by rivets 6, and their extreme ends are flanged at 2ᶜ to fit upon the flanges of the T-irons to which they are secured by rivets 7.

The hub structure of the pulley comprises two sections 3, each section, as illustrated in Fig. 4, comprising a U-shaped plate which for convenience will be hereinafter termed a yoke or saddle. The pair of these saddles, because of the semi-circular recesses 3ª of their flanges, form between them, when assembled as seen in Fig. 1, a shaft opening in which may be arranged, if desired, a hub thimble 4. This thimble is of the split type and each half thereof is held to its respective hub section or saddle by means of a rivet 8 or the like. Each saddle fits over or straddles its set or pair of spoke arms as clearly indicated in Fig. 3, and is secured to the flanges 2ᵇ thereof in suitable manner, as by the rivets 9. The pair of saddles are thus so positioned as to have their flanges directed toward each other and to form the shaft opening between them as above stated.

The pulley is provided with two sets of clamping bolts, the outer ones 10, passing between the sets of spoke arms which are slightly folded outwardly to make bolt openings (Fig. 2), and the inner ones 11, arranged in two pairs, one pair on each side of the shaft opening. The latter clamping bolts pass through the tops of the saddles and also engage marginal notches or recesses in the spoke arms, as seen in Fig. 2. In a small diameter pulley the outer clamping bolts may be dispensed with.

It will be understood that the number of sets of the spoke arms and their hub structure may be increased as desired, according to the width of rim face or according to the diameter of pulley.

Although I have described more or less precise forms and details of construction, I do not intend to be understood as limiting myself thereto, as I contemplate changes in form, proportion of parts, and the substitution of equivalents as circumstances may suggest or render expedient, without departing from the spirit and scope of my invention and claims.

I claim:

1. A pulley comprising a rim, pairs of spoke arms connected therewith and extending substantially diametrically across the pulley, a hub structure comprising two sections or saddles each fitting over or straddling its pair of spoke arms with its center portion bearing upon the outer faces of said spoke arms, the hub sections also forming the shaft opening, and means for clamping the hub sections together; substantially as described.

2. A pulley comprising a rim, a plurality of spoke arms connected therewith and extending substantially diametrically across the pulley, said spoke arms being arranged in pairs on each side of a diameter of the pulley, a hub structure comprising two sections or saddles forming the shaft opening between them and each fitting over or straddling a plurality of spoke arms on its side of the shaft opening, and clamping bolts engaging both the sections and spoke arms; substantially as described.

3. A pulley comprising a rim, a plurality of spoke arms connected therewith and extending substantially diametrically across the pulley, said spoke arms being arranged in pairs on each side of a diameter of the pulley, a hub structure comprising two sections or saddles forming the shaft opening between them and each fitting over or straddling the pair of spoke arms on its side of the shaft opening, said saddles being secured to the spoke arms, and clamping bolts engaging both the sections and spoke arms; substantially as described.

4. A pulley comprising a rim, a plurality of spoke arms connected therewith and extending substantially diametrically across the pulley, said spoke arms being arranged in pairs, a hub structure comprising two sections or saddles forming the shaft opening between them and each fitting over or straddling the pair of spoke arms on its side of the shaft opening, in combination with a hub thimble, and clamping bolts engaging both the sections and spoke arms; substantially as described.

5. A pulley comprising a rim, a plurality of spoke arms connected therewith and extending across the pulley, said spoke arms being arranged in pairs, and consisting of angle irons with their inwardly directed flanges face to face, and a hub structure comprising two sections or saddles forming the shaft opening between them and each fitting over or straddling the pair of spoke arms on its side of the shaft opening, in combination with a hub thimble and means for securing such thimble to the hub structure; substantially as described.

6. A pulley comprising a rim, a plurality of spoke arms connected therewith and extending across the pulley, said spoke arms being arranged in pairs, and consisting of angle irons with their inwardly directed flanges face to face, and a hub structure comprising two sections or saddles forming the shaft opening between them and each fitting over or straddling the spoke arms on its side of the shaft opening, in combination with a hub thimble secured to the said saddles; substantially as described.

7. A pulley comprising a rim, pairs of substantially diametrically extending spoke arms consisting of angle irons, and composed of two flanges $2^a$ and $2^b$, and saddles 3 straddling the spoke arms, each saddle having a flat plate portion fitting upon the said flanges $2^b$ and also having inwardly directed flanges; substantially as described.

8. A pulley comprising a rim, pairs of substantially diametrically extending spoke arms consisting of angle irons connected therewith at their ends and composed of two flanges $2^a$ and $2^b$, and saddles 3 straddling the spoke arms, each saddle having a flat plate portion fitting upon and secured to said flanges $2^b$, and also having inwardly directed flanges with curved recesses to form the shaft opening; substantially as described.

9. A pulley comprising a rim, spoke arms consisting of angle irons connected therewith at their ends, said spoke arms being arranged in a plurality of pairs, saddles forming the shaft opening between them and each straddling a plurality of spoke arms on its side of the shaft opening; and clamping bolts engaging both the saddles and angle irons, substantially as described.

10. A pulley comprising a rim, spoke arms consisting of angle irons connected therewith at their ends and composed of the two flanges $2^a$ and $2^b$, the corresponding spoke arms of the pairs thereof being arranged with their flanges $2^a$ parallel and adjacent each other, and saddles 3 forming the shaft opening between them and each straddling a set of spoke arms on its side of the shaft opening; substantially as described.

11. A pulley comprising rim segments, spoke arms connected therewith and consisting of angle irons composed of the two flanges $2^a$ and $2^b$, with their corresponding flanges adjacent saddles forming the shaft opening between them and each straddling a set of spoke arms on its side of the shaft opening, and clamping bolts passing through said saddles for clamping them together and upon a shaft; substantially as described.

12. A pulley comprising rim segments, spoke arms connected therewith and consisting of angle irons composed of the two flanges 2$^a$ and 2$^b$, with their corresponding flanges adjacent saddles forming the shaft opening between them and secured to said flanges 2$^b$ of the spoke arms, each saddle straddling a set of spoke arms on its side of the shaft opening, and clamping bolts passing through said saddles for clamping them together and upon a shaft; substantially as described.

13. A pulley comprising rim segments, spoke arms connected therewith and consisting of angle irons composed of the two flanges 2$^a$ and 2$^b$, said spoke arms being bent outwardly near their outer ends to form bolt openings, outer clamping bolts in said bolt openings, saddles forming the shaft opening between them and mounted on the spoke arms, and inner clamping bolts passing through said saddles; substantially as described.

14. A pulley comprising rim segments spoke arms connected therewith and consisting of angle irons composed of the two flanges 2$^a$ and 2$^b$, said spoke arms being bent outwardly near their outer ends to form bolt openings, outer clamping bolts in said bolt openings, saddles forming the shaft opening between them and mounted on the spoke arms, inner clamping bolts passing through said saddles, and a split hub thimble, each half being secured to one of the saddles; substantially as described.

15. A pulley comprising a rim, pairs of spoke arms connected therewith and extending substantially diametrically across its pulley, a hub structure comprising two sections or saddles each fitting over or straddling a pair of spoke arms, each section comprising a flat plate bearing upon the outer faces of said spoke arms and two parallel inwardly directed flanges which have curved recesses so as to form the shaft opening; substantially as described.

16. A split pulley comprising rim segments, two pairs of parallel spoke arms extending substantially diametrical of the pulley but on either side of the division line thereof, and a hub structure comprising two sections or saddles each fitting over or straddling a pair of spoke arms; substantially as described.

HENRY J. GILBERT.

Witnesses:
S. E. HIBBEN,
LOUIS B. ERWIN.

Copies of this patent may be obtained for five cents each, by addressing the "Commissioner of Patents, Washington, D. C."